Figure 1:
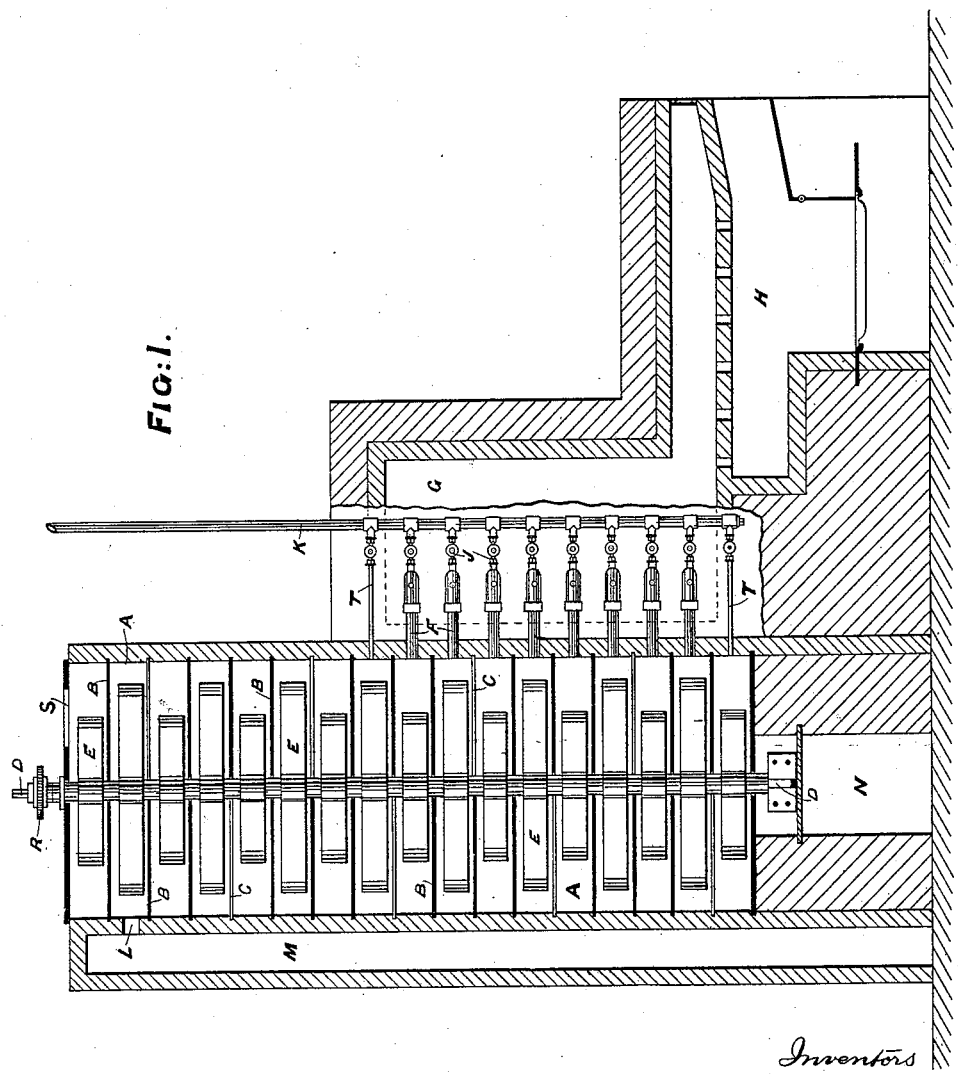

(No Model.) 2 Sheets—Sheet 1.

B., W. & B. S. FOSTER.
DRYING APPARATUS.

No. 524,039. Patented Aug. 7, 1894.

Witnesses
Chas H. Smith
J. Staib

Inventors
Benjamin Foster
William Foster
Benjamin S. Foster
per Lemuel W. Serrell
Atty (No Model.)  B., W. & B. S. FOSTER.  2 Sheets—Sheet 2.
DRYING APPARATUS.

No. 524,039.  Patented Aug. 7, 1894.

Witnesses
Chas H Smith
J. Staib

Inventors
Benjamin Foster
William Foster
Benjamin S. Foster
per Lemuel W. Serrell
Atty

UNITED STATES PATENT OFFICE.

BENJAMIN FOSTER, WILLIAM FOSTER, AND BENJAMIN SEDGWICK FOSTER, OF LEEDS, ENGLAND.

DRYING APPARATUS.

SPECIFICATION forming part of Letters Patent No. 524,039, dated August 7, 1894.

Application filed February 9, 1894. Serial No. 499,583. (No model.) Patented in England January 13, 1894, No. 828.

*To all whom it may concern:*

Be it known that we, BENJAMIN FOSTER, WILLIAM FOSTER, and BENJAMIN SEDGWICK FOSTER, all subjects of the Queen of Great Britain and Ireland, residing at Leeds, in the county of York, England, have invented new and useful Improvements in or Connected with Apparatus for Drying, Roasting, or Calcining Organic Matter and other Materials, (for which a patent has been granted us in Great Britain, dated January 13, 1894, No. 828,) of which the following is a full, clear, and exact description.

Our invention refers to improvements in apparatus for drying, roasting, or calcining animal matter in a ready, efficient and automatic manner.

Heretofore machines or apparatus have been devised for drying various materials, particularly grain and the like and such apparatus has been contained within a tower-like structure, divided by floors composed of hollow casings, into which casings hot air has been passed to heat the air within the structure and the grain has been passed through the structure from floor to floor to become dried by the air heated divisions. Now for the purpose of our invention, namely, to quickly and thoroughly dry animal matters, such apparatus is not sufficiently powerful and effective, for we have found that heated air mixed with steam (superheated or otherwise) is far more effective, when applied so as to come into direct and intimate contact with the moving mass to be dried, and moreover, the great heat requisite for effecting our aforesaid object in a proper manner is sometimes liable to cause the moving mass of material to ignite, and it is necessary to provide means whereby such combustion may be readily and quickly extinguished and this without it being necessary to suspend operations.

With these objects we have invented an apparatus composed of a vertical cylindrical chamber divided horizontally by a number of fixed single metal plates forming floors; an aperture is formed in each floor, so arranged that the said aperture in one floor is situated to the side of that of the floor below and so on in such manner that the said openings come one below another in helical form, but it is to be understood that the openings are not immediately one below another. A central vertical shaft having horizontal arms thereon is fitted within the cylindrical chamber, one such arm being provided on the shaft for each plate acting to carry the matter to be dried over the plate surface and cause it to be precipitated through the aperture therein onto the next lower plate and so on, and a number of injectors are provided whereby steam and air are forced into the chamber entering between the various floors passing through the entire cylindrical chamber and escaping at the upper part into a flue, while from the steam pipe supplying the injectors, branches extend into the drying chamber, whereby should ignition of the drying material occur, steam is admitted and the fire thereby extinguished.

Figure 3:
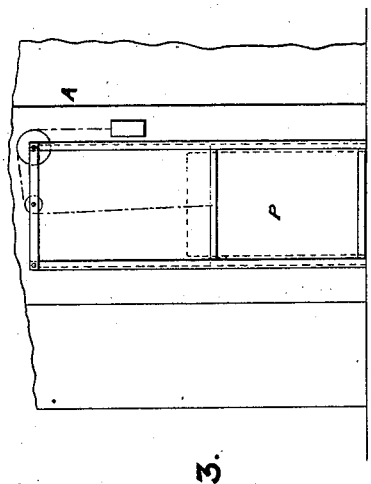
Figure 2:
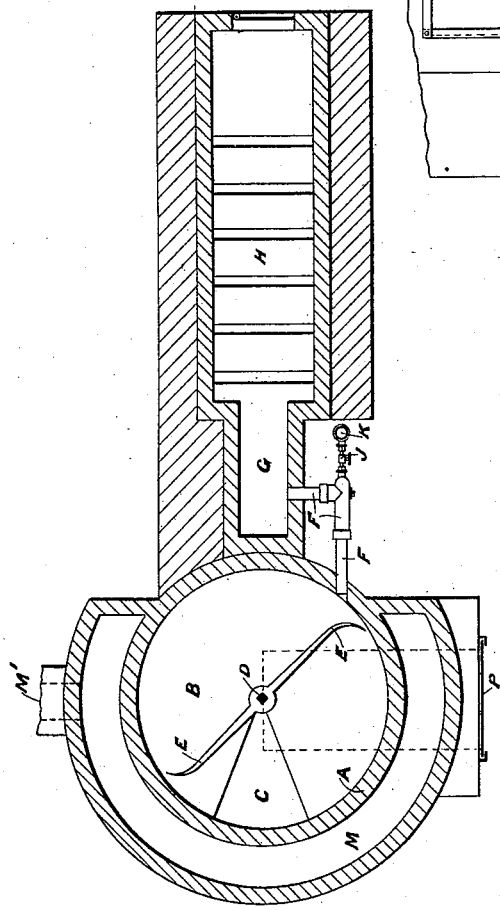

Our invention is shown by reference to the accompanying drawings, Figure 1 being a transverse section of such an apparatus; Fig. 2 a sectional plan of same and Fig. 3 a detail view.

According to our invention we provide the vertical cylindrical chamber A constructed of non-combustible material, with plates B situated one above the other at suitable distances apart and dividing the chamber into compartments. The material to be dried is fed in at the top of the structure through an opening S and a portion of each of the plates B is cut away, forming apertures C, each opening C being situated to the side of the opening in the plate above in such a manner that the openings form a helical curve within the column A.

A shaft D is mounted vertically in the column A and passes through the center of the plates B. Arms E are mounted on the shaft D between the plates B in such a manner that on the shaft D being rotated, the said arms E are caused to revolve, whereby the material on each plate B is carried round until it drops through its opening C onto the plate B below.

Pipes F are connected to the spaces between the plates B, such pipes being in communication with the combustion chamber G of the furnace H. Steam blowers or injectors J which are connected to the steam pipe K are employed in conjunction with the pipes F, in such a manner that on the blast being set in action, the hot products of combustion are drawn from the chamber G of the furnace H and injected into the column A.

The products of combustion pass from the column A through holes L at the upper part thereof, and down the circular chamber M to a flue M' at the bottom, the wall forming the circular chamber being constructed of non-combustible material in part with the column A, such chamber M forming a jacket, whereby the heat is retained within the said column A.

The material falls from the column A through the opening C of the last plate B, into the pit N below, from whence it is removed at pleasure. The front of this pit N has a sliding door P, which can be readily opened and closed when required.

When it is required to dry, roast or calcine the animal matter, the shaft D is rotated through the medium of the wheel R, and the steam blast is applied at the pipes F. The material is fed in at the top of the column A through the opening S, and is carried round the upper plate B by one of the arms E until such material falls through the opening C onto the next plate B, when it is again carried round until it again falls through the next opening C, and this action continues until the material falls out at the base of the column A into the pit N. By raising the sliding door P, access is given to the said pit N, from whence the material may be removed at will.

In the action of descending from plate to plate against the ascending hot products of combustion, (which are injected by the steam blowers or injectors into the column A,) the material becomes hotter and hotter until it encounters such a heat that the required result is obtained.

Steam jets T are connected directly to the column A so that should a fire break out within the column through excessive heat, steam can be turned on, thereby extinguishing the fire immediately.

We claim as our invention—

1. In an apparatus for drying, roasting or calcining materials, a vertical cylindrical chamber adapted to be fed at the upper end and having horizontal plates dividing the chamber into compartments, there being an opening in each plate and the openings not being in line, in combination with a rotating central shaft, arms in the compartments connected to said shaft and adapted to move the material around on the plates to the openings therein, a furnace and hot air chamber, pipes from the hot air chamber into the compartments, a steam pipe and ejectors connected therewith and entering the aforesaid pipes for injecting the hot air from the hot air chamber into the compartments, and an exit-flue and a discharge for the calcined materials, substantially as specified.

2. In an apparatus for drying, roasting or calcining materials, a vertical cylindrical chamber adapted to be fed at the upper end and having horizontal plates dividing the chamber into compartments, there being an opening in each plate and the openings not being in line, in combination with a rotating central shaft, arms in the compartments connected to said shaft and adapted to move the material around on the plates to the openings therein, a furnace and hot air chamber, pipes from the hot air chamber into the compartments, a steam pipe and ejectors connected therewith and entering the aforesaid pipes for injecting the hot air from the hot air chamber into the compartments, and jet pipes T for admitting live steam alone into the compartments, and an exit-flue and a discharge for the calcined materials, substantially as specified.

BENJAMIN FOSTER.
WILLIAM FOSTER.
BENJAMIN SEDGWICK FOSTER.

Witnesses:
GRIFFITH BREWER,
JOHN JOWETT.